(12) United States Patent
Zhang

(10) Patent No.: US 7,546,762 B2
(45) Date of Patent: Jun. 16, 2009

(54) ACUTE ANGLE PRESSURE SENSOR PROBE AND METHOD

(75) Inventor: Guoqing Zhang, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/217,568

(22) Filed: Sep. 1, 2005

(65) Prior Publication Data

US 2007/0044547 A1 Mar. 1, 2007

(51) Int. Cl.
*G01M 15/10* (2006.01)

(52) U.S. Cl. .................................. 73/114.76

(58) Field of Classification Search ............... 73/23.31, 73/23.32, 114.69, 114.71, 114.72, 114.73, 73/114.74, 114.75, 114.76
See application file for complete search history.

(56) References Cited

U.S. PATENT DOCUMENTS

| | | | |
|---|---|---|---|
| 5,305,602 A * | 4/1994 | Kojima et al. ................. 60/286 |
| 5,651,250 A * | 7/1997 | Kawamura ..................... 60/303 |
| 6,112,575 A * | 9/2000 | Cocconi ..................... 73/23.31 |
| 6,551,498 B2 | 4/2003 | Nelson |
| 6,756,904 B2 * | 6/2004 | Kinugawa et al. ............ 340/606 |
| 6,851,258 B2 | 2/2005 | Kawashima et al. |
| 2003/0106308 A1* | 6/2003 | Gabe et al. ..................... 60/295 |
| 2006/0101793 A1* | 5/2006 | Gregoire et al. ............ 55/282.3 |
| 2006/0112679 A1* | 6/2006 | Kojima et al. .................. 60/278 |
| 2006/0117740 A1* | 6/2006 | Okugawa et al. ............... 60/285 |
| 2006/0137660 A1* | 6/2006 | Shirakawa et al. ........... 123/493 |
| 2006/0179826 A1* | 8/2006 | Kuboshima et al. ............ 60/297 |

* cited by examiner

Primary Examiner—Eric S McCall
(74) *Attorney, Agent, or Firm*—Jack D. Nimz; Jeffrey P. Calfa

(57) ABSTRACT

A sensor probe (116) includes a probe tip (205) having a probe centerline (207). A pressure tube (209) fluidly connects the probe tip (205) with a pressure sensor (115). A pipe (107) having a centerline (201) is connected to the sensor probe (116). The pipe centerline (201) and the probe centerline (207) form an acute angle such that the probe tip (205) points in a downstream direction of the pipe (107).

8 Claims, 3 Drawing Sheets

US 7,546,762 B2

ACUTE ANGLE PRESSURE SENSOR PROBE AND METHOD

FIELD OF THE INVENTION

This invention relates to internal combustion engines, including but not limited to exhaust gas pressure sensor probes for compression ignition engines.

BACKGROUND OF THE INVENTION

Newer diesel engines have diesel particulate filters (DPFs) incorporated in their exhaust systems to filter carbon and other particulates from the exhaust gas stream. When enough particulate material has accumulated on or around the filter element, the DPF begins to plug and requires regeneration. Regeneration is a process whereby deposits on the filter element of the DPF are induced to combust, typically by raising the engine exhaust temperature. The combustion event of a DPF regeneration cleans the filter element of the DPF of deposits by burning carbon accumulations and turning them into ash. The regeneration process repeats as often as necessary to maintain smooth and reliable engine operation.

In many diesel engines, an electronic control unit (ECU) controls and monitors the operation of engine components. The ECU typically sends commands to various systems of the engine, including commands intended to trigger regeneration of a DPF. One parameter of great importance to regeneration of the DPF is the pressure difference upstream and downstream of the filter element of the DPF. The pressure difference across the DPF can be correlated to the extent of the filter's plugging with carbon and other deposits. By obtaining a reliable and accurate measurement of the pressure differential across the DPF, the engine controller may initiate a regeneration event at an optimal time.

Typical engines have at least two pressure probes or sensors installed across a DPF filter, or other components in the exhaust system. Typical pressure probes include a tube that is inserted perpendicularly to an exhaust pipe segment, usually in a radial direction with respect to a centerline of the pipe segment. A typical installation of pressure probes in an exhaust system can been seen, for example, in U.S. Pat. No. 6,851,258 by Kawashima et al. Typical installations of pressure sensor probes are prone to fouling of the probes, yielding inaccurate readings of the pressure sensors attached to them.

Many different attempts to rectify the fouling of sensors have occurred in exhaust systems. Permeable shields, as can be seen for example in U.S. Pat. No. 6,551,498 by Nelson, have been used to protect sensors from the ill effects of carbon or other deposits on the sensing passages and elements. These solutions are costly and may create new problems. When using pressure sensor probes, one may desire little to no obstruction of the sensor probe, so as to not impede gas dynamics in the probe that are required for accurate sensor readings. Use of a shield with a pressure probe will likely impede optimal sensor operation.

Accordingly, there is a need for a method of protecting pressure sensor probes placed in an exhaust system of an engine that is cost effective and does not affect the operation of the sensor.

SUMMARY OF THE INVENTION

A sensor probe includes a probe tip having a probe centerline. A pressure tube fluidly connects the probe tip with a pressure sensor. A pipe having a centerline is connected to the sensor probe. The pipe centerline and the probe centerline form an acute angle such that the probe tip points in a downstream direction of the pipe.

DESCRIPTION OF A PREFERRED EMBODIMENT

Figure 1:
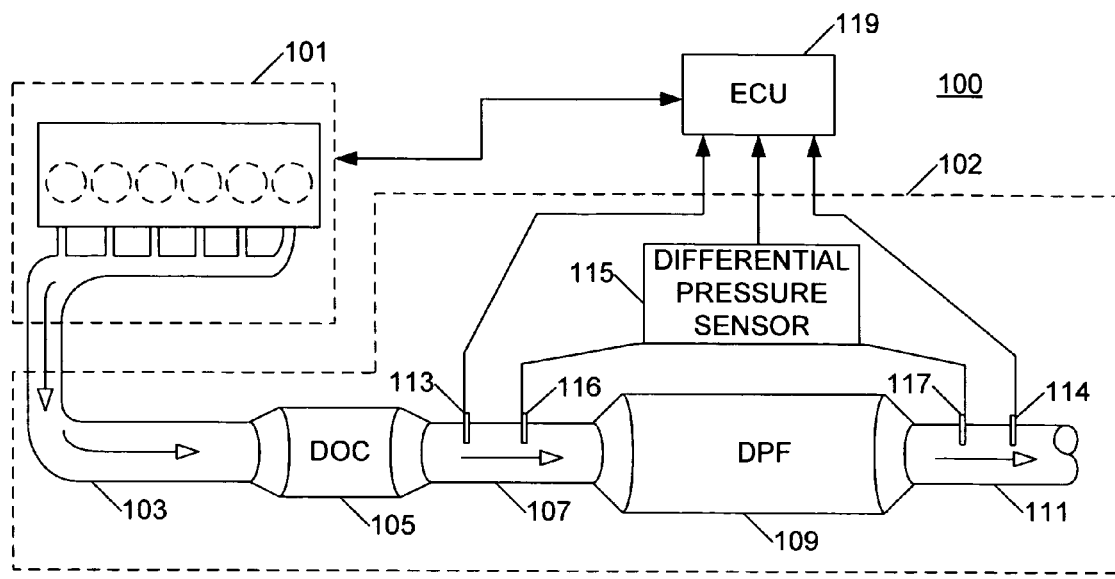
FIG. 1 is a block diagram of an engine having sensor probes in an exhaust pipe in accordance with the invention.

The following describes a method for using pressure sensor probes in an exhaust system of an engine. In a preferred embodiment, a differential pressure sensor is installed in an exhaust system of an engine and arranged to measure the pressure upstream and downstream of a diesel particulate filter (DPF). The pressure differential across the DPF may be calculated and used in an engine controller to infer the extent of fouling of the DPF. Loss of performance and an increase in biasing of the differential pressure sensor may lead to improper readings of the pressure difference across the DPF and result in a less than optimal operation of the engine. Loss of performance of the differential pressure sensor may be the result of carbon deposits in a pressure sensor probe, especially the pressure sensor probe placed upstream of the DPF.

An engine 100 includes a base engine 101 and an after-treatment system 102. Hollow arrowheads in the figure represent airflow direction. The base engine 101 is connected to the after-treatment system 102 via an exhaust pipe 103. The exhaust pipe 103 is connected to a catalyst 105, which in turn is connected to a pipe segment 107 leading to a DPF 109. The DPF 109 is connected to a tailpipe 111 which may also include a muffler (not shown) or other components. The after-treatment system 102 may also include a variety of sensors to monitor its operation. For example, a first temperature sensor 113 may be disposed in the pipe segment 107 upstream of the DPF 109, and a second temperature sensor 114 may be disposed in the tailpipe 111 downstream of the DPF 109. The after-treatment system 102 also includes a differential pressure sensor 115.

The differential pressure sensor 115 is arranged to measure a pressure difference across the DPF 109. An upstream pressure probe 116 is connected to the pipe segment 107 upstream of the DPF 109. A downstream probe 117 is connected to the tailpipe 111 downstream of the DPF 109. The two probes 116 and 117 are connected to the sensor 115. Typical differential pressure sensors include an internal diaphragm (not shown) having strain gages (not shown) attached thereon. The diaphragm is usually isolated from the environment and either side of the diaphragm is in fluid communication with volumes whose pressures are being compared. Pressure differences between these volumes cause the diaphragm to deflect. Deflections of the diaphragm are translated into electrical signals by the strain gages. These electrical signals from the strain gages are relayed to a device, like an electronic control unit (ECU) 119, where they are interpreted and the pressure differential between the two volumes is determined, in this case, the pressure differential between the pipe segment 107 upstream of the DPF 109 and the tailpipe 111 downstream of the DPF 109.

The differential pressure sensor 115 uses at least two probes placed across the component being measured, in this case, the DPF 109. Differential pressure sensors may also be used across other components or volumes on the engine as is known in the art. The sensitivity of the differential pressure sensor 115 depends on the physical characteristics of the diaphragm. Often, carbon particles from the exhaust gas passing through the after-treatment system 102 enter the differential pressure sensor 115 and deposit on the diaphragm by traveling through the upstream probe 116. These carbon deposits may partially plug the probe 116 and may also collect on the diaphragm. If the probe 116 is partially plugged, or if carbon deposits collect onto the diaphragm of the sensor 115, the information being relayed to the ECU 119 may not be accurate and may become skewed or biased. One example of a differential pressure sensor available in the market may be a sensor having a useful life of 450,000 miles or 10 years, capable of measuring a differential pressure range of between 0 and 40.46 kPaD with an operating voltage between 4.9 and 5.1 Volts, a total accuracy of +/−3% of the operating voltage, and a response time of 10 ms.

Figure 2:
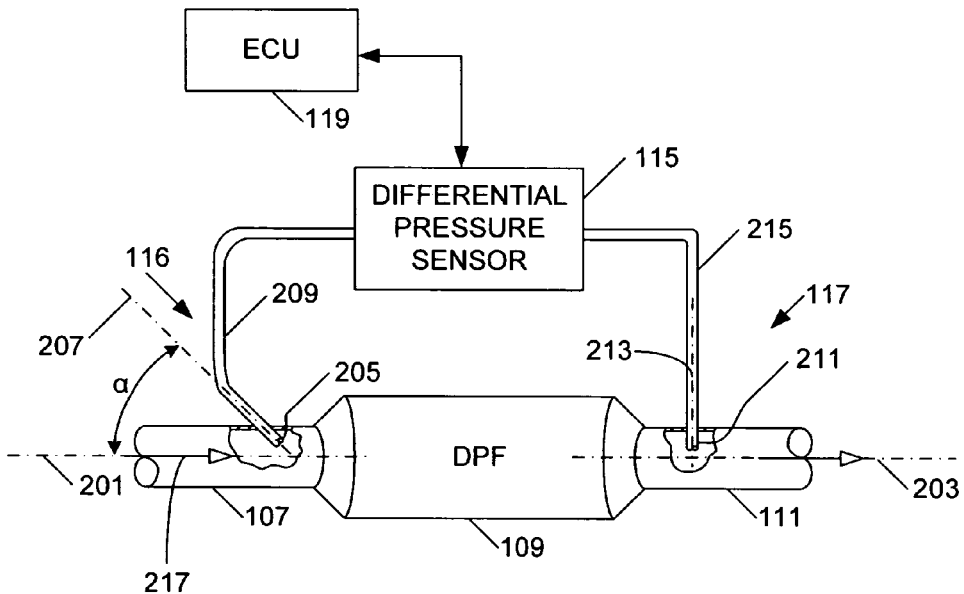
FIG. 2 is a block diagram of an upstream sensor probe installed in a pipe segment in accordance with the invention.

A block diagram of an installation of the upstream probe 116 and the downstream probe 117 around the DPF 109 is shown in FIG. 2. The pipe segment 107 having a centerline 201 is upstream of the DPF 109. The tailpipe 111 having a centerline 203 is downstream of the DPF 109. The probe 116 is installed in the pipe segment 107 upstream of the DPF 109 and includes a probe tip 205 having a probe centerline 207. A pressure tube 209 connects the probe tip 205 with the differential pressure sensor 115. The probe 117 is installed in the tailpipe 111, downstream of the DPF 109, and includes a probe tip 211 having a probe centerline 213. A pressure tube 215 connects the probe tip 211 with the differential pressure sensor 115.

In a preferred embodiment, the upstream probe 116 on the pipe segment 107 is connected such that carbon contamination of the probe 116 and the sensor 115 is avoided. As exhaust gas travels through the pipe segment 107, carbon particles included in the gas are carried along, having a momentum along the centerline 201 of the pipe segment 107. The momentum of the carbon particles is represented by a momentum vector 217. The probe centerline 207 and, advantageously, the probe tip 205 are pointed away from the direction of incoming carbon particles which travel substantially along the momentum vector 217. The probe tip 205, which may also be a bent portion at the end of the probe 116, is arranged to point toward the downstream direction of flow and is advantageously disposed on the probe centerline 207. The probe centerline 207 may form an angle, α, with the centerline 201 of the pipe segment 107. The angle α is advantageously an acute angle.

By angling the sensor tip 205 away from incoming carbon particles traveling in the pipe segment 107 and upstream of the DPF 109 during engine operation, carbon contamination of the probe 116 and the differential pressure sensor 115 is significantly reduced. It has been determined that any value for the angle α may be used, but special advantage may be realized if the angle α is between 30 and 75 degrees, as defined earlier, between the centerline 201 and the probe centerline 207. The angle α should be oriented such that the probe tip 205 is pointing in a downstream direction of the flow in the pipe segment 107, thus facing away from the momentum vector 217 of the carbon particles traveling in the pipe segment 107 during engine operation.

The function of the DPF 109 is to trap carbon particles within a filter (not shown). For this reason, it may not be necessary to install the downstream probe 117 at an acute angle with respect to the flow. Byproducts of DPF regeneration may include solid particles like ash, for example, that may also contaminate the differential pressure sensor. An engineering determination should be made concerning the potential of contamination of the differential pressure sensor 115 downstream of the DPF 109 at a developmental stage of the after-treatment system 102. If it is determined that the differential pressure sensor 115 will not become contaminated with ash, then it is more cost effective and easier for manufacturing to install the probe 117 with its probe centerline 213 perpendicular to the centerline 203. If it is determined that the differential pressure sensor 115 can be contaminated from material entering the probe 117, then the probe 117 may be installed similar to the probe 116.

In an alternate embodiment of this invention, an installation of the downstream probe 117 on the tail pipe 111 that helps avoid ash contamination of the probe 117 and the sensor 115 is disclosed. As exhaust gas travels through the tail pipe 111, ash present after a regeneration of the DPF may be carried along with the exhaust gas and have a momentum vector along the centerline 203 of the tail pipe 111. The momentum of the ash particles is represented by a momentum vector 301. An angled probe centerline 303 is arranged to point away from incoming flow, and along the momentum vector 301. The probe centerline 303 forms an angle, β, with the centerline 203 of the tail pipe 111. The angle β is advantageously an acute angle. An angled probe tip 305 located along the angled probe centerline 303 is pointed away from the incoming exhaust gas flow as discussed above.

By angling the sensor tip 305 away from the momentum vector 301 of the ash particles traveling in the tail pipe 111, downstream of the DPF 109, ash contamination of the probe 117 and the differential pressure sensor 115 may be reduced. It has been determined that any value may be used for the angle β, but special advantages may be realized if the angle β is between 30 and 75 degrees. The angle β should orient the probe tip 305 such that the probe tip 305 points downstream of the flow in the tail pipe 111, thus having a component that faces away from the momentum vector 301 of the ash particles traveling in the tail pipe 111 during engine operation.

Figure 3:
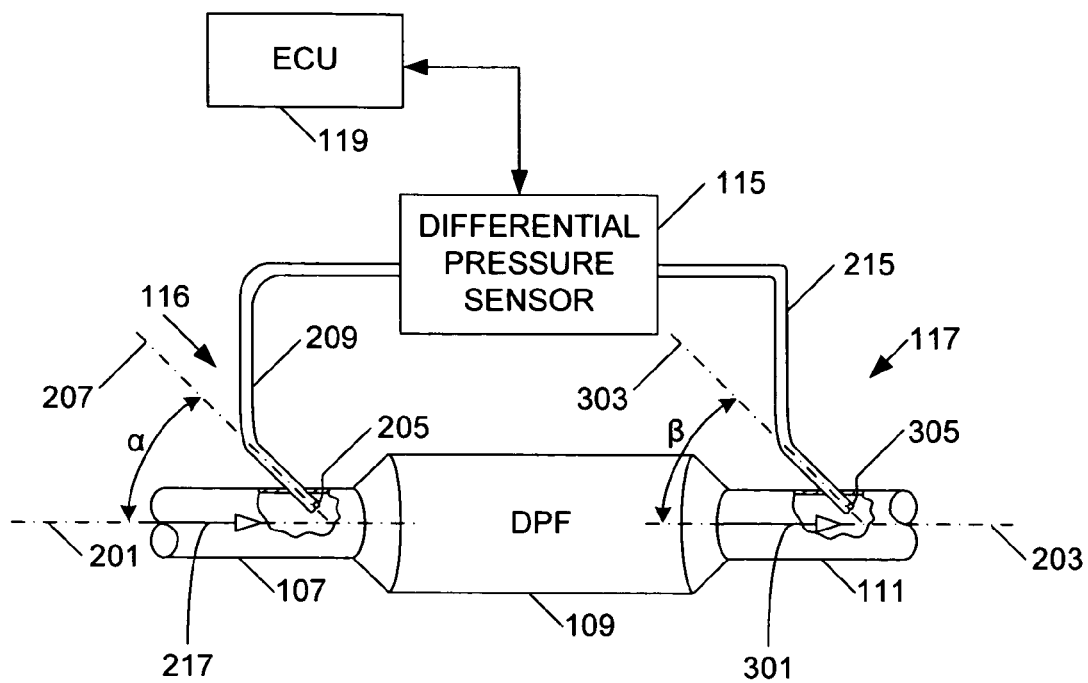
FIG. 3 is a block diagram of a downstream sensor probe installed in a tail pipe in accordance with the invention.
Figure 4:
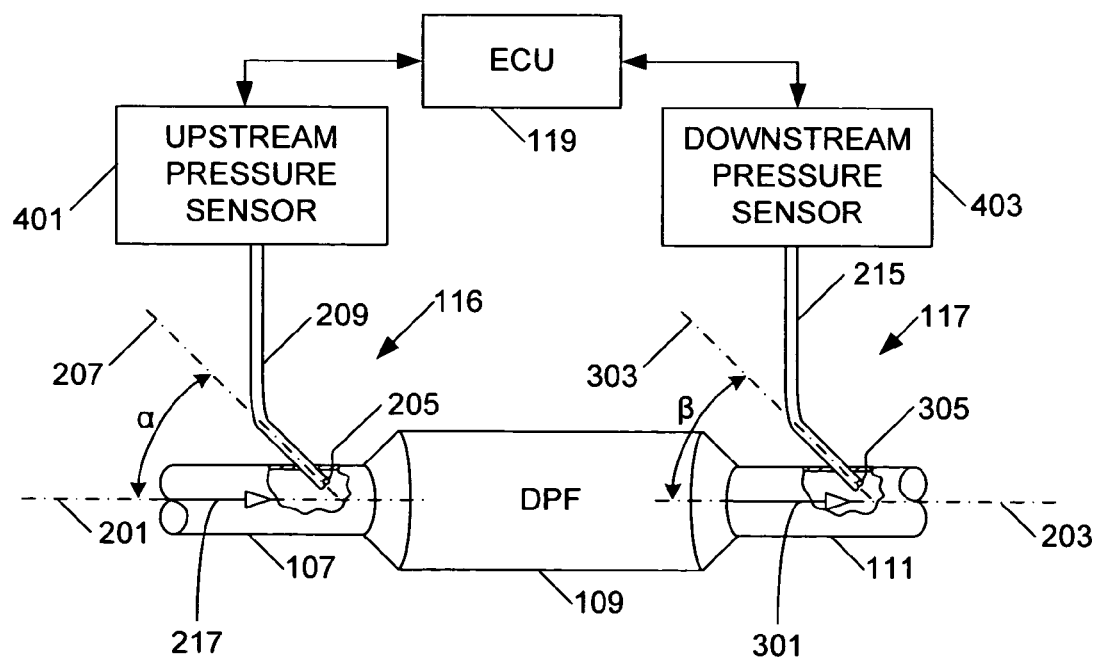
FIG. 4 is a block diagram of an alternate embodiment of an engine having sensor probes installed in accordance with the invention.

An alternate embodiment is shown in FIG. 4. The differential pressure sensor 115 may be replaced by an upstream pressure sensor 401 and a downstream pressure sensor 403. The probes 116 and 117 may be arranged according to the same configurations as discussed above, and as shown in the embodiments of FIG. 2 and FIG. 3. The sensors 401 and 403, each, may include a diaphragm (not shown) that is open to each of the volumes within the pipe segment 107 and the tail pipe 111, respectively on one side, and vented to the atmosphere on the other side. Measurements from each of the sensors 401 and 403 may be relayed to the ECM 119 where the individual measurement values may be subtracted to yield the desired pressure differential. Each of the sensors 401 and 403 may be prone to contamination in a similar fashion as the sensor 115 as discussed earlier. For the sake of brevity, elements common between the embodiment of FIG. 4 and the embodiments presented earlier are denoted by the same reference numerals and are not described in detail.

Figure 5:
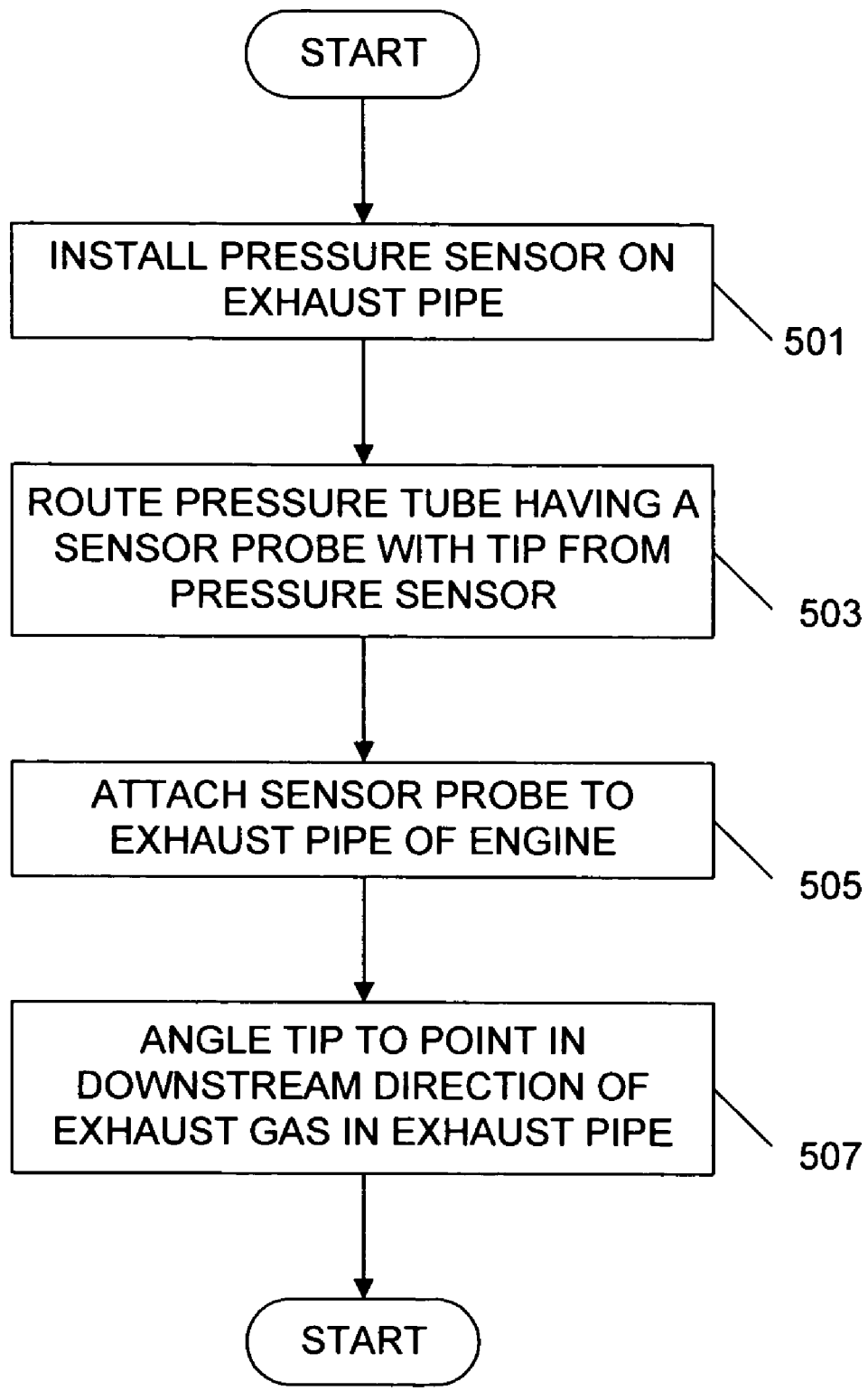
FIG. 5 is a flowchart for a method of installing a pressure sensor probe on an exhaust pipe of an engine.

A flowchart for a method of using a pressure probe on an exhaust pipe of an engine is shown in FIG. 5. A pressure sensor is installed in an exhaust pipe in step 501. The exhaust pipe may advantageously be part of a tailpipe system for an internal combustion engine installed in a vehicle. A pressure tube having a sensor probe with a tip on one end is connected to the pressure sensor and routed toward the exhaust pipe in step 503. The sensor probe is attached to the exhaust pipe in step 505 to fluidly connect the exhaust pipe with the pressure sensor. The tip is angled to point away from an incoming exhaust flow direction of the exhaust pipe in step 507. A second pressure sensor, or alternatively, a differential pressure sensor may also be used. In the case of use of a second pressure sensor or a differential pressure sensor, a second pressure tube may also be routed in a similar fashion as the first pressure tube. The angle between the exhaust pipe and the probe tip is an acute angle, preferably within a range of 30 to 75 degrees, although other angles may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A sensor probe located upstream of an exhaust particulate filter and disposed in exhaust gas having carbon particles, the sensor probe comprising:
   a probe tip having an exhaust gas inlet opening and a probe centerline;
   a pressure tube fluidly connecting the probe tip with a pressure sensor;
   wherein a pipe having a pipe centerline is disposable around the probe tip such that said probe tip protrudes into the pipe;
   said pipe configured to channel exhaust gases such that said carbon particles included in the exhaust gas have a momentum vector at said exhaust gas inlet opening that is parallel to said pipe centerline;
   wherein the pipe centerline and the probe centerline form an acute angle when the pipe is disposed around the probe tip; and
   wherein the probe tip points in a downstream direction of the pipe when the pipe is disposed around the probe tip, such that the probe tip is pointed away from the direction of carbon particles traveling along the momentum vector toward the exhaust particulate filter to reduce entry of carbon particles into said exhaust gas inlet opening.

2. The sensor probe of claim 1, wherein the acute angle is between 30 degrees and 75 degrees.

3. The sensor probe of claim 1, wherein the pipe is disposed upstream of a diesel engine particulate filter.

4. The sensor probe of claim 1, wherein the pressure sensor is connected to an electronic engine controller.

5. A sensor system for an internal combustion engine, comprising:
   an exhaust pipe having a pipe centerline, an upstream end, and a downstream end;
   a differential pressure sensor, having a first probe and a second probe disposed on the exhaust pipe;
   a diesel particulate filter disposed in the exhaust pipe between the first probe and the second probe;
   wherein the first probe has a first probe tip having a first exhaust gas inlet opening and a first centerline;
   wherein the first probe tip is disposed in the exhaust pipe at a first location close to the upstream end of the exhaust pipe;
   wherein said exhaust pipe at said first location is configured to channel exhaust gases such that carbon particles included in the exhaust gas have a momentum vector at said first exhaust gas inlet opening that is parallel to said pipe centerline;
   wherein the first centerline forms an acute angle with the pipe centerline of the exhaust pipe such that the first tip faces the downstream end of the exhaust pipe, such that the first probe tip is pointed away from the direction of carbon particles traveling along the momentum vector toward the exhaust particulate filter to reduce entry of carbon particles into said first exhaust gas inlet opening.

6. The sensor system of claim 5,
   wherein the second probe has a second probe tip having a second centerline and a second exhaust gas opening;
   wherein the second tip is disposed close to the downstream end of the exhaust pipe at a second location;
   wherein the second tip centerline forms an acute angle with the centerline of the exhaust pipe such that the second tip points toward the downstream end of the exhaust pipe, such that the second probe tip is pointed away from the momentum direction of any carbon particles traveling away from the exhaust particulate filter at said second exhaust gas opening to reduce entry of carbon particles into said second exhaust gas opening.

7. The sensor system of claim 5, wherein the differential pressure sensor includes at least two diaphragms.

8. The sensor system of claim 5, further comprising an electronic engine controller connected to the differential pressure sensor.

* * * * *